United States Patent
Tanaka

(10) Patent No.: US 7,308,752 B2
(45) Date of Patent: Dec. 18, 2007

(54) METHOD FOR MAKING AN OPTICAL PICKUP APPARATUS HAVING A MOVABLE UNIT SUPPORTED BY SPRINGS ATTACHED TO A FIXED UNIT

(75) Inventor: Tetsu Tanaka, Tokyo (JP)

(73) Assignee: Sony Corporation (JP)

( * ) Notice: Subject to any disclaimer, the term of this patent is extended or adjusted under 35 U.S.C. 154(b) by 477 days.

(21) Appl. No.: 10/854,216

(22) Filed: May 27, 2004

(65) Prior Publication Data

US 2005/0002287 A1    Jan. 6, 2005

(30) Foreign Application Priority Data

Jun. 10, 2003  (JP) .................... P2003-164941

(51) Int. Cl.
  *H04R 31/00*  (2006.01)
  *H01R 43/24*  (2006.01)
(52) U.S. Cl. .................. 29/603.1; 29/827; 29/848; 29/856; 29/858; 264/272.11; 264/272.14; 720/682
(58) Field of Classification Search ............. 29/603.03, 29/603.04, 603.1, 603.07, 827, 848, 856, 29/858; 438/111, 112, 611; 720/682, 685; 720/686; 361/723; 264/272.11, 272.14, 264/272.17
See application file for complete search history.

(56) References Cited

U.S. PATENT DOCUMENTS 4,189,085 A * 2/1980 Penrod .................... 438/111 X
4,701,999 A * 10/1987 Palmer ........................ 29/827

(Continued)

FOREIGN PATENT DOCUMENTS

JP    1-272069   * 10/1989 ............ 264/272.11
JP    10-269611    10/1998

(Continued)

OTHER PUBLICATIONS

Kim et al., "Integrated Micro Optical Flying Head with Lens Positioning Actuator for Small Form Factor Data Storage", TRANSDUCERS—Solid State Sensors, Actuators and Microsystems, pp. 607-610, Jun. 2003.*

(Continued)

*Primary Examiner*—A. Dexter Tugbang
(74) *Attorney, Agent, or Firm*—Rader Fishman & Grauer PLLC; Ronald P. Kananen

(57) ABSTRACT

An optical pickup apparatus is described which includes a movable unit with an objective lens, a focus servo coil for moving the moveable unit containing the objective lens in the optical-axis direction, and tracking servo coils for moving the moveable unit containing the objective lens in the horizontal directions, and a liquid crystal element disposed for correcting the refractive index. Springs simultaneously provide support for the moveable unit and feed power to the liquid crystal element, the focus servo coil, and the tracking servo coils. A method for making said optical pickup apparatus is described. Two sheets, each having four springs extending across an opening formed by punching, are disposed parallel to each other at a predetermined distance. On these sheets, a fixed unit and a movable unit are formed by insert-molding. Excess portions of the metal sheets are removed, and a through-hole is formed so that connected portions of the wirings, lying side by side, are disconnected. Then, an objective lens, a focus servo coil, tracking servo coils, and a liquid crystal element are mounted on the movable unit.

9 Claims, 13 Drawing Sheets

U.S. PATENT DOCUMENTS 6,570,828 B2    5/2003   Kikuchi et al.
5,589,402 A  *  12/1996  Ramsey et al. ........... 29/827 X
6,172,957 B1    1/2001   Ogasawara

FOREIGN PATENT DOCUMENTS

| JP | 2001-266394 | 9/2001 |
| JP | 2001-319353 | 11/2001 |
| JP | 2001-344783 | 12/2001 |
| JP | 2002-319172 | 10/2002 |

OTHER PUBLICATIONS

Japanese Office Action dated Jun. 21, 2006 for Application No. 2003-164941.

* cited by examiner

--PRIOR ART--

METHOD FOR MAKING AN OPTICAL PICKUP APPARATUS HAVING A MOVABLE UNIT SUPPORTED BY SPRINGS ATTACHED TO A FIXED UNIT

BACKGROUND OF THE INVENTION

1. Field of the Invention

The present invention relates to an optical pickup apparatus and a method for making this apparatus. More specifically, the invention relates to an optical pickup apparatus having a movable unit resiliently supported by springs attached to a fixed unit. The movable unit includes an objective lens for converging an optical beam onto a recording surface of a disk recording medium.

2. Description of the Related Art

An optical disk player reads and writes information on a disk recording medium by moving an optical pickup unit in the radial direction of the rotating disk recording medium. To read out the information recorded on the optical disk, the optical pickup has a focus control function for focusing an optical spot between the information track and the objective lens of the optical pickup unit and a tracking control function for adjusting the position of the optical pickup unit in response to the displacement of the information track in the radial direction of the optical disk.

FIG. 13 illustrates a known optical pickup apparatus having a focusing control function and a tracking control function. In this optical pickup apparatus, an objective lens 1, a focus servo coil 2, tracking servo coils 3, and a bobbin 4 for winding the focus servo coil 2 are mounted on a movable unit 5. The movable unit 5 is resiliently supported by four springs 6 attached to a fixed unit 5. More specifically, the movable unit 5 is resiliently supported by two springs 6 on the left and two springs 6 on the right attached to the fixed units 5. By applying a control current via the springs 6 to the focus servo coil 2 and the tracking servo coils 3, the position of the objective lens 1 is controlled in the focusing and tracking directions.

Japanese Unexamined Patent Application Publication No. 2001-319353 discloses an optical pickup apparatus having an objective lens holder supported by four spring wires so that the holder can be driven in the focusing and tracking directions of the optical disk. A magnetic circuit for driving the holder is displaced so that its center is shifted towards the periphery of the optical disk. The resilience of the spring wires closer to the inner circumference of the optical disk is reduced by increasing the amount of gel, which is a damping material, applied to the spring wires compared to the amount of gel applied to the spring wires closer to the outer circumference of the optical disk. In this way, the holder is driven in the focusing direction at a predetermined angle so that the optical axis of the objective lens is always substantially orthogonal to the signal recording surface of the optical disk, even when the focusing height changes due to warping of the optical disk. Accordingly, the movable unit supporting the objective lens adjusts the skew of the optical pickup apparatus.

In multimedia, large amounts of various information signals, such as image data and audio data, must be processed at once. There are known optical disks having a high recording density and a reduced size that satisfy such a demand. For example, such a disk may have a diameter of 120 mm and a thickness of 1.2 mm, wherein two disks having a disk substrate thickness of 0.6 mm are bonded together, or may have a thickness of 1.2 mm wherein an optical disk having a thickness of 0.6 mm is bonded together with a disk reinforcement plate. Such disks are generally known as a digital versatile disk (DVD). More specifically, a DVD has a reflective surface, i.e., a signal recording surface, formed 0.6 mm inwards in the thickness direction from the signal readout surface.

A known optical disk for increasing the recording density without reducing the allowable limit for tilting the disk is an optical disk having a diameter of 120 mm and a thickness of 1.2 mm formed by bonding an optical disk with a thickness of 0.1 mm with a disk reinforcement plate with a thickness of 1.1 mm. This optical disk is known as a high recording density disk. More specifically, for this high recording density disk, the reflective surface, i.e., the signal recording surface, is formed 0.1 mm inwards from the signal readout surface.

An optical pickup apparatus for reproducing an information signal from a high recording density disk has an objective lens with a numerical aperture (NA) of 0.7 or more. For example, the optical pickup apparatus has a two-lens-group wherein the optical axes of the two lenses are aligned. The two-lens-group unit includes a first lens, which is a front lens facing the high recording density disk and a second lens, which is a rear lens disposed so that its optical axis is aligned with the first lens. A NA of 0.7 or more is achieved by using both the first and second lenses.

There is a demand for optical pickup apparatuses capable of reading different types of disks, such as CDs, CD-Rs, or high recording density disks. The above-mentioned optical pickup apparatus for reading information signals from a high recording density disk cannot read other optical disks, such as CDs or DVDs, because the position of the signal recording surface differs with respect to the thickness of the disk. The difference in the position of the signal recording surface causes spherical aberration and wave aberration, making it impossible to read the optical disk. Means for correcting the wave aberration by a liquid crystal element is disclosed in, for example, Japanese Unexamined Patent Application Publication No. 10-269611.

To correct the wave aberration and provide an optical pickup apparatus capable of reading optical disks having signal recording surfaces at different positions along the thickness of the disk, the liquid crystal element must be accurately aligned with the objective lens. Thus, it is desirable to mount the liquid crystal element on the movable unit supporting the objective lens.

Mounting the liquid crystal element on the movable unit, however, requires power feeding to the focus servo coil and the tracking servo coils that control the objective lens in the optical-axis direction and the horizontal direction, respectively, and to the electrodes of the liquid crystal element. However, the optical pickup apparatus according to FIG. 13 and Japanese Unexamined Patent Application Publication No. 2001-319353 does not have enough springs for feeding power. Thus, means for feeding power to the liquid crystal element, such as a flexible substrate, must be added to the apparatus. For this reason, the accuracy and the efficiency of the assembly are reduced. There is also a problem in that, when power is fed to the liquid crystal element via a flexible substrate, the responsiveness of the focus servo coil and the tracking servo coils is reduced because of the damping of the flexible substrate.

SUMMARY OF THE INVENTION

The present invention has taken into consideration the above-mentioned problems. In particular, an object of the present invention is to provide an optical pickup apparatus that includes means for adjusting the position of the objective lens on the movable unit by moving the objective lens in the optical-axis direction and in the horizontal direction. Another object of the present invention is to provide an optical pickup apparatus that solves the problems involved with increasing the number of required power feeding means due to the mounting of means for correcting the refractive index on the movable unit. Another object of the present invention is to provide an optical pickup apparatus that does not reduce the accuracy and efficiency of the assembly and the responsiveness of the control by the focus servo coil and the tracking servo coils.

The present invention relates to an optical pickup apparatus having a movable unit resiliently supported by springs attached to a fixed unit. The movable unit includes an objective lens for converging an optical beam onto a recording surface of a disk recording medium. Moreover, the present invention relates to an optical pickup apparatus having at least three springs disposed on the same plane.

For the optical pickup apparatus according to the present invention, it is preferable to dispose at least three springs on a plane substantially parallel to the recording surface of the disk recording medium. The end of each of the springs is attached to the fixed unit, and the other end is attaché to at least a part of the movable unit to form a composite unit. It is preferable to form at least three springs simultaneously on the same plane for each metal sheet to be inserted into a cast to form the composite unit.

It is preferable to provide means for correcting the refractive index of the light emitted onto the disk recording medium on the movable unit. It is also preferable to form the means for correcting the refractive index with a liquid crystal element and to correct the wave aberration generated at the surface of the disk recording medium. Furthermore, it is preferable to resiliently support the movable unit with at least six springs to provide a movement adjustment means for controlling the movement for adjusting the position of the objective lens in the optical-axis direction and in the radial direction of the disk recording medium and to feed power to the movement adjustment means and the liquid crystal element via the springs. The movement adjustment means for adjusting the position of the objective lens in the optical-axis direction is preferably a focus servo coil. The movement adjustment means for adjusting the position of the objective lens in the radial direction of the disk recording medium are preferably tracking servo coils.

It is preferable to dispose four springs on each of the two planes substantially parallel to the recording surface of the disk recording medium so that a total of eight springs are attached to the fixed unit to resiliently support the movable unit and so that power is fed via the eight springs to the focus servo coil, tracking servo coils, and the liquid crystal element for correcting the refractive index. It is preferable to form a plurality of electrodes concentrically arranged with the optical axis on the surface of one of the glass substrates of the liquid crystal element and to apply different voltages to the plurality of electrodes via the springs.

The present invention relates to a method for making an optical pickup apparatus by punching out a metal sheet to form at least three springs extending across an opening of the sheet and forming a fixed unit and a movable unit on both ends of the springs by insert-molding and, then, removing the excess portions of the sheet after the molding.

It is preferable to form a sheet having four springs (two springs each on the left and right sides) that extend across the opening of the sheet and, then, to form a fixed unit and a movable unit on the sheet by insert-molding. It is preferable to dispose two sheets, which each have four springs (two springs each on the left and right sides), substantially parallel to each other and, then, to form a fixed unit and a movable unit on each of the ends of the springs by insert-molding to resiliently support the movable unit by the springs attached to the fixed unit.

A preferable embodiment of the present invention is an objective lens driving apparatus, which is an optical pickup actuator, having a movable unit including an objective lens system for converging light emitted from a light source onto an optical disk and a fixed unit having at least four springs (in which at least three of the springs are disposed on the same plane) for supporting the movable unit. The springs are integrated with the fixed unit and a part of the movable unit to form a composite unit. For each metal circuit core inserted into a cast to form the composite unit, at least three springs are simultaneously formed on the same plane.

The movable unit of the objective lens driving apparatus having the above-mentioned structure is supported by at least six springs. The movable unit includes driving means for driving the objective lens in at least the optical-axis direction and the radial direction of the optical disk with at least two degrees of freedom. Power is fed to the driving means and the liquid crystal element via the springs.

In this way, a plurality of springs (four or more springs) can be formed as part of a composite unit and the accuracy and the efficiency of the assembly can be improved. Moreover, no additional circuit cores need to be inserted into the cast, enabling the structure of the cast to be simple. The centers of the objective lens and the liquid crystal element can be accurately aligned on the same axis. Accordingly, optical disks having signal recording surfaces at different positions in the direction of the thickness of the disk can be read.

According to the above-mentioned embodiment of an objective lens driving apparatus, three or more springs can be simultaneously formed on the same plane for each metal circuit core inserted in a cast to form a composite unit. Even when the number of springs is increased, the structure of the cast does not become complicated and stable molding becomes possible. Moreover, by forming the springs as part of a composite unit, the springs can be accurately positioned. In this way, requirements concerning highly accurate dimensions can be met. Since a plurality of springs can be disposed, sufficient power can be fed to the driving means and the liquid crystal element via the springs.

The present invention is an optical pickup apparatus having a movable unit including an objective lens for converging an optical beam onto a recording surface of a disk recording medium resiliently supported by springs connected to a fixed unit, wherein at least three springs are disposed on the same plane.

According to an optical pickup apparatus of the present invention, a movable unit is resiliently supported by at least three springs on the same plane and power can be fed to the controlling means on the movable unit via these springs. Thus, power can be fed to the correction means mounted on the movable unit for correcting the refractive index.

The method for making an optical pickup apparatus according to the present invention includes the steps of punching out a metal sheet to form three or more springs extending across an opening of the metal sheets, performing insert-molding to form a fixed unit and a movable unit on both ends of the springs, and removing the excess portions of the sheets after the molding.

According to such a method for making an optical pickup apparatus, a fixed unit and a movable unit are formed on a sheet by insert-molding and, then, the excess portions of the sheet are removed. In this way, an optical pickup apparatus having a movable unit resiliently supported by springs attached to a fixed unit can be produced efficiently and highly accurately.

DESCRIPTION OF THE PREFERRED EMBODIMENTS

Figure 1:
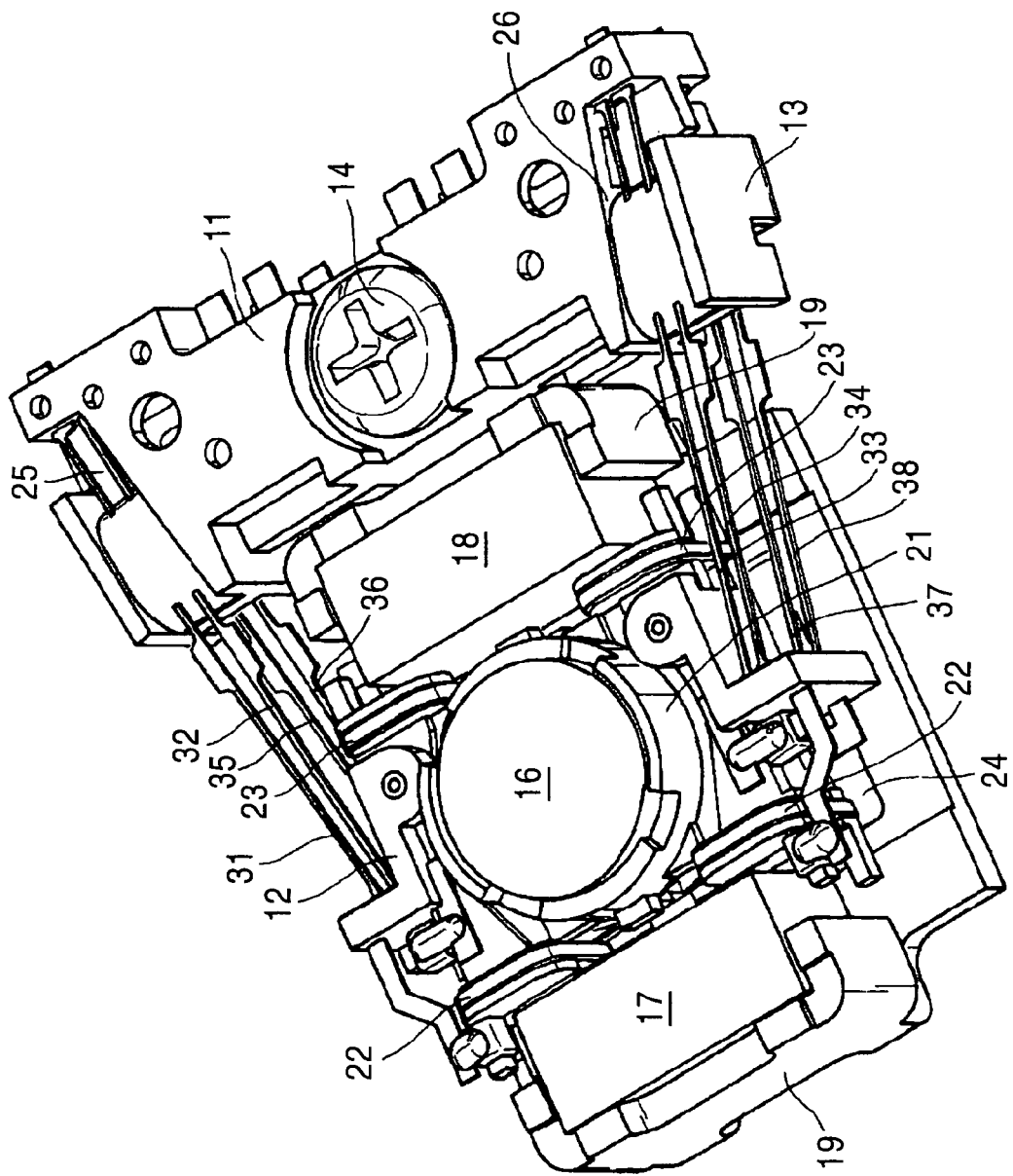
FIG. 1 is an external perspective view of an optical pickup apparatus.
Figure 2:
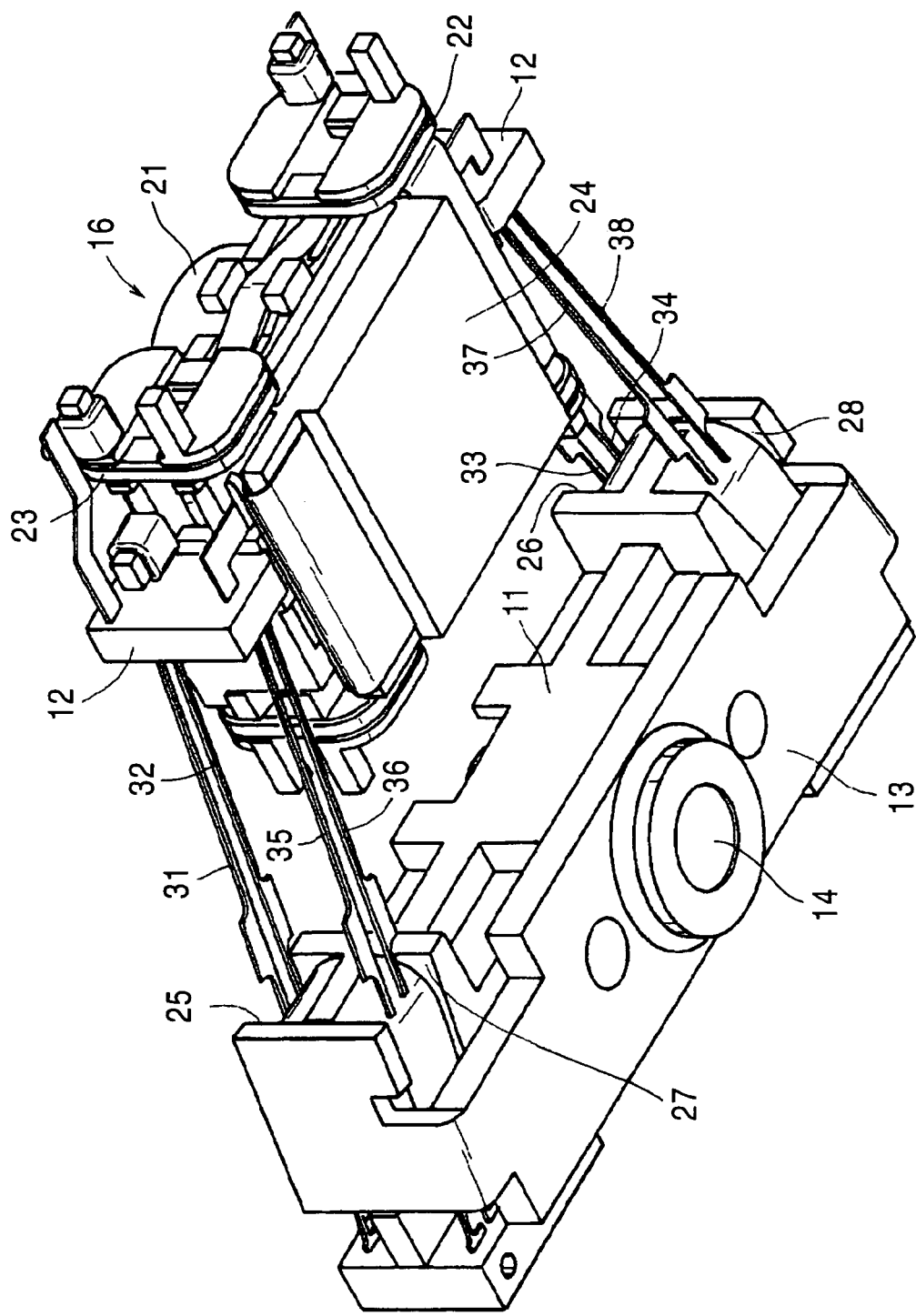
FIG. 2 is an external perspective view of the optical pickup apparatus of FIG. 1 viewed from below.
Figure 3:
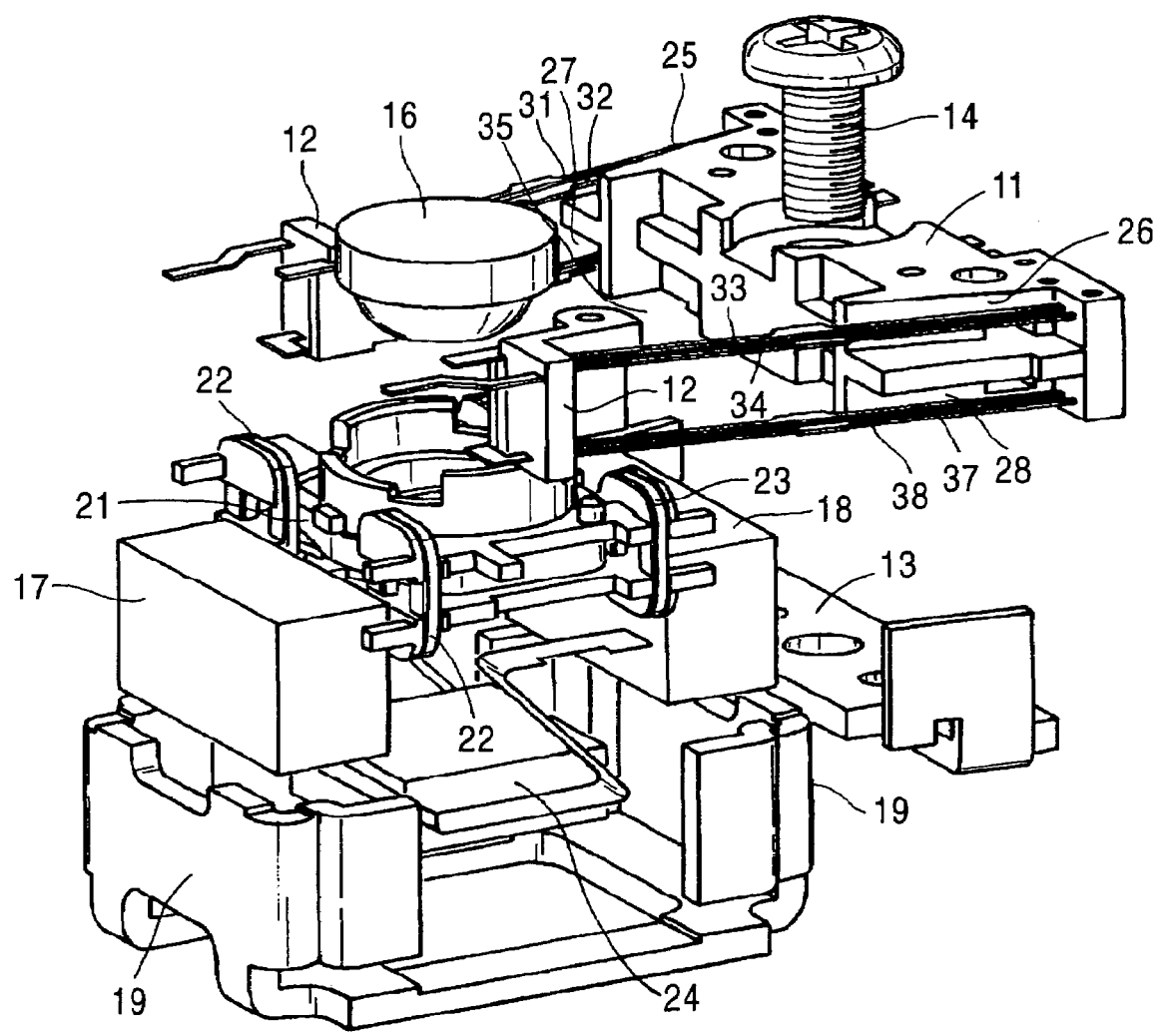
FIG. 3 is an exploded perspective view of the optical pickup apparatus of FIG. 1.

The present invention is described by illustrating an embodiment according to the present invention. FIGS. 1 to 3 illustrate the overall structure of an optical pickup apparatus according to an embodiment of the present invention. The optical pickup apparatus includes a fixed unit 11 disposed near the base of the optical pickup apparatus and a movable unit 12 disposed near the tip of the optical pickup apparatus. A two-axis adjustment plate 13 is fixed to the lower surface of the fixed unit 11 with a screw 14 screwed in from the upper portion of the fixed unit 11.

The movable unit 12 positioned in front of the fixed unit 11 includes an objective lens 16. The objective lens 16 is interposed between a forward magnet 17 and a rear magnet 18 supported by yokes 19. The yokes 19 supporting the magnets 17 and 18 are fixed and cannot be moved, whereas the movable unit 12 can be moved. A focus servo coil 21 is disposed around the periphery of the objective lens 16. A pair of tracking servo coils 22 is disposed in front of the focus servo coil 21 on the left and right sides. Moreover, a pair of tracking servo coils 23 is disposed behind the focus servo coil 21. The optical pickup apparatus has a liquid crystal element 24 disposed below the objective lens 16. This liquid crystal element 24 corrects the refractive index to reduce wave aberration.

The focus servo coil 21 and the tracking servo coils 22 and 23 provide means for adjusting the position of the objective lens 16 in the optical-axis direction and the horizontal direction, respectively. To adjust the positioning of the objective lens 16, the movable unit 12 must be movably supported by the fixed unit 11. Hence, the upper left portion and the upper right portion of the movable unit 12 are supported by springs 31 and 32 and springs 33 and 34, respectively. Similarly, the lower left portion and the lower right portion of the movable unit 12 are supported by springs 35 and 36 and springs 37 and 38, respectively.

Figure 4:
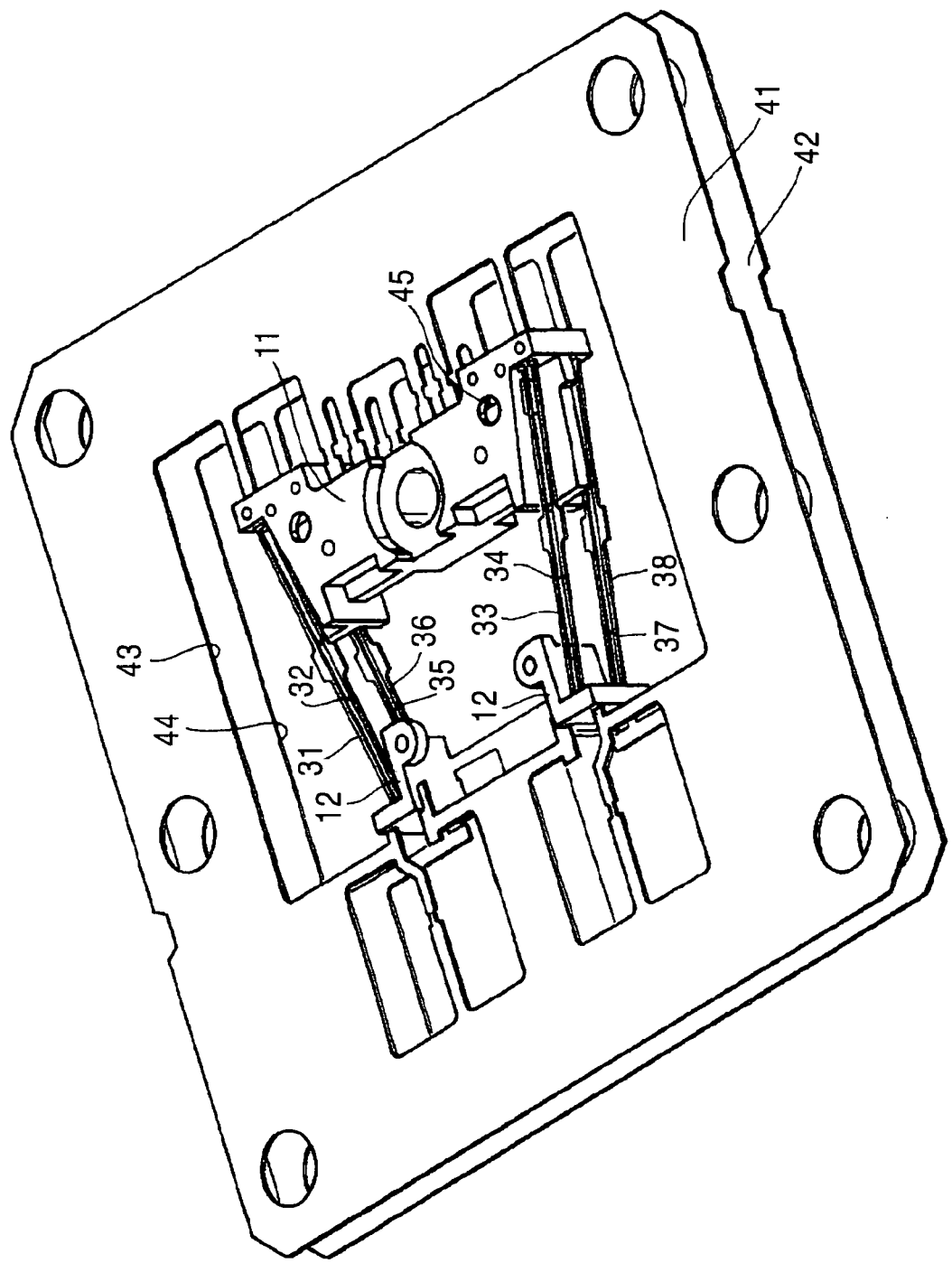
FIG. 4 is an external perspective view of an optical pickup apparatus immediately after a fixed unit and a movable unit have been mounted by insert-molding.

The four springs 31 to 34 connecting the fixed unit 11 and the movable unit 12 are formed by punching out an opening 43 in an upper sheet 41, as illustrated in FIG. 4. The lower four springs 35 to 38 are formed by punching out an opening 44 in a lower sheet 42, as illustrated in FIG. 4. More specifically, the sheets 41 and 42 are disposed facing each other in parallel at a predetermined distance. By insert-molding the fixed unit 11 and the movable unit 12 so that they form a composite unit with the sheets 41 and 42, the ends of the springs 31 to 38 are attached to the fixed unit 11 and the movable unit 12 to connect the two units.

In this way, the optical pickup apparatus according to an embodiment of the present invention is structured so that the objective lens 16 is bonded to the movable unit 12. The focus servo coil 21 and the tracking servo coils 22 and 23 are attached to the movable unit 12 to provide means for driving the movable unit 12 in the focus and tracking directions. The liquid crystal element 24 is disposed below the objective lens 16. The springs 31 to 38 that provide means for feeding power and means for support are formed so that their substrate ends are connected to the fixed unit 11 and their forward ends are connected to the movable unit 12.

FIG. 4 illustrates the optical pickup apparatus including the movable unit 12, which is made of liquid polymer containing glass fibers mixed in as an additive, the springs 31 to 38, and the fixed unit 11, which is also made of liquid polymer containing glass fibers. The drawing illustrates the state immediately after insert-molding has been performed. The optical pickup apparatus illustrated in FIG. 4 is formed as a composite unit by insert-molding, wherein the metal sheets 41 and 42, composed of a metal such as beryllium copper, phosphor bronze, or stainless steel, are inserted into a metal cast. On each of the sheets 41 and 42, four springs (springs 31 to 34 and springs 35 to 38, respectively) are formed to extend across the openings 43 and 44, respectively, on the external frames for fixing the position of the metal cast. When using this composite unit as an optical pickup apparatus, excess portions of the external frames of the sheets 41 and 42 are removed.

One of the ends of each of the springs 31 to 34 is soldered to each of the four terminals of the focus servo coil 21 and the tracking servo coils 21 and 22 to feed power. The ends of the springs 36 and 37 are connected to the liquid crystal element 24 through a flexible substrate to feed power to the liquid crystal element 24. The other ends of the springs 31 to 38 are soldered to a relay flexible substrate fixed to the fixed unit 11.

The two-axis adjustment plate 13 is bonded to the bottom surface of the fixed unit 11 and is fixed with the screw 14, as illustrated in FIGS. 2 and 3. Two grooves 25 and 26 are formed on the upper surface of the fixed unit 11 with spaces to attach the springs 31 and 32 and the springs 33 and 34, respectively. Similarly, two grooves 27 and 28 are formed on the lower surface of the fixed unit 11 with spaces to attach the springs 35 and 36 and the springs 37 and 38, respectively. The movable unit 12 including the objective lens 16, the focus servo coil 21, and the tracking servo coil 22 is cantilevered from the fixed unit 11 by the springs 31 to 38. Then, the grooves 25 to 28 are filled with a damper composed of ultraviolet-curable gel to damp the springs 31 to 34.

The yokes 19 made of a magnetic material have a pair of magnets 17 and 18 disposed in the front and rear forming a magnetic circuit. When electrical power is applied to the springs 31 and 32, an electrical current is applied to the focus servo coil 21. Thus, the objective lens 16 can be driven in the focus direction, i.e. optical-axis direction, with respect to the information tracks of the optical disk. When electrical power is applied to the springs 33 and 34, an electrical current is applied to the tracking servo coil 22. Thus, the position of the objective lens 16 can be adjusted in the horizontal direction.

Figure 6:
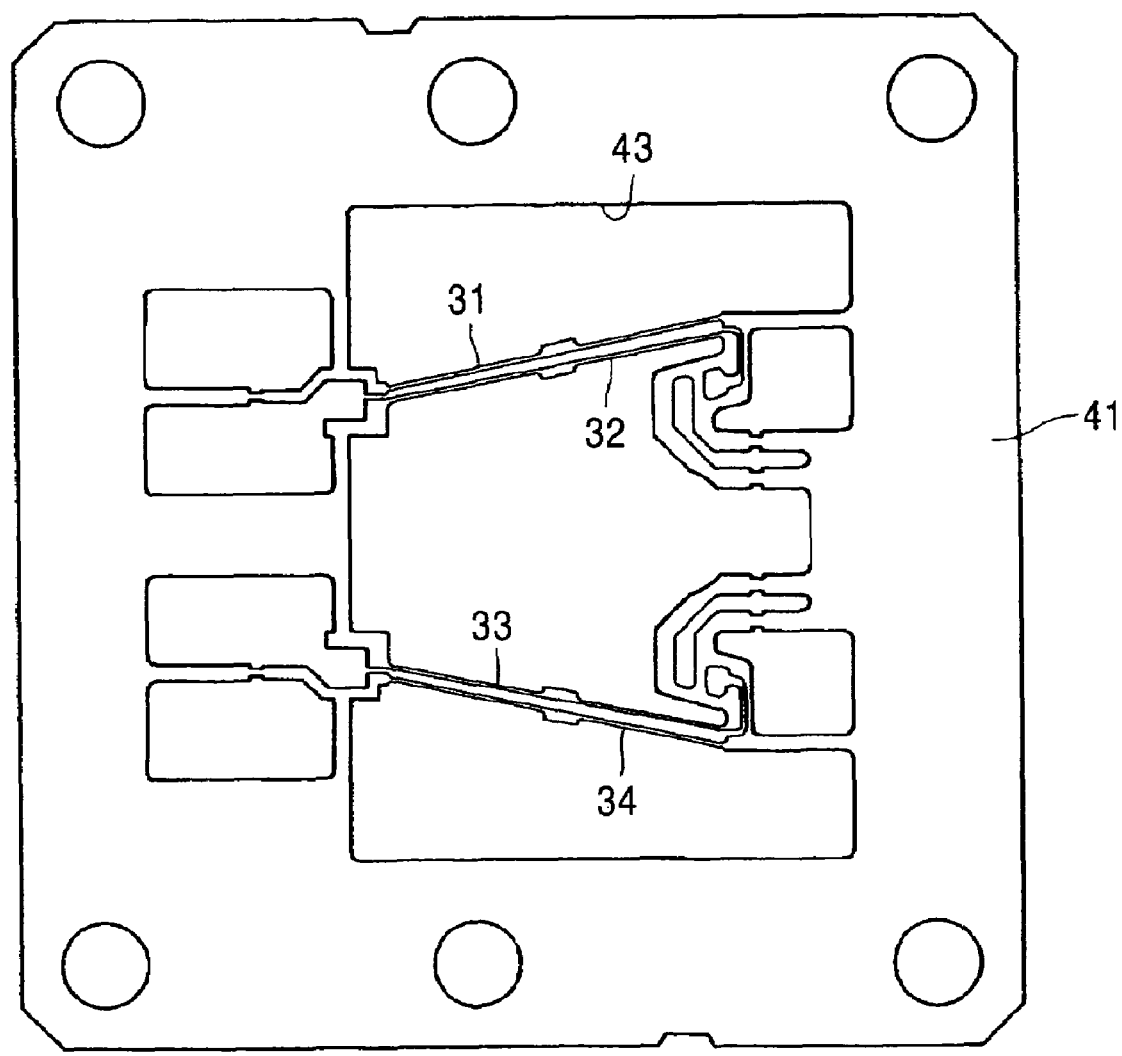
FIG. 6 is a plan view of the upper sheet.
Figure 7:
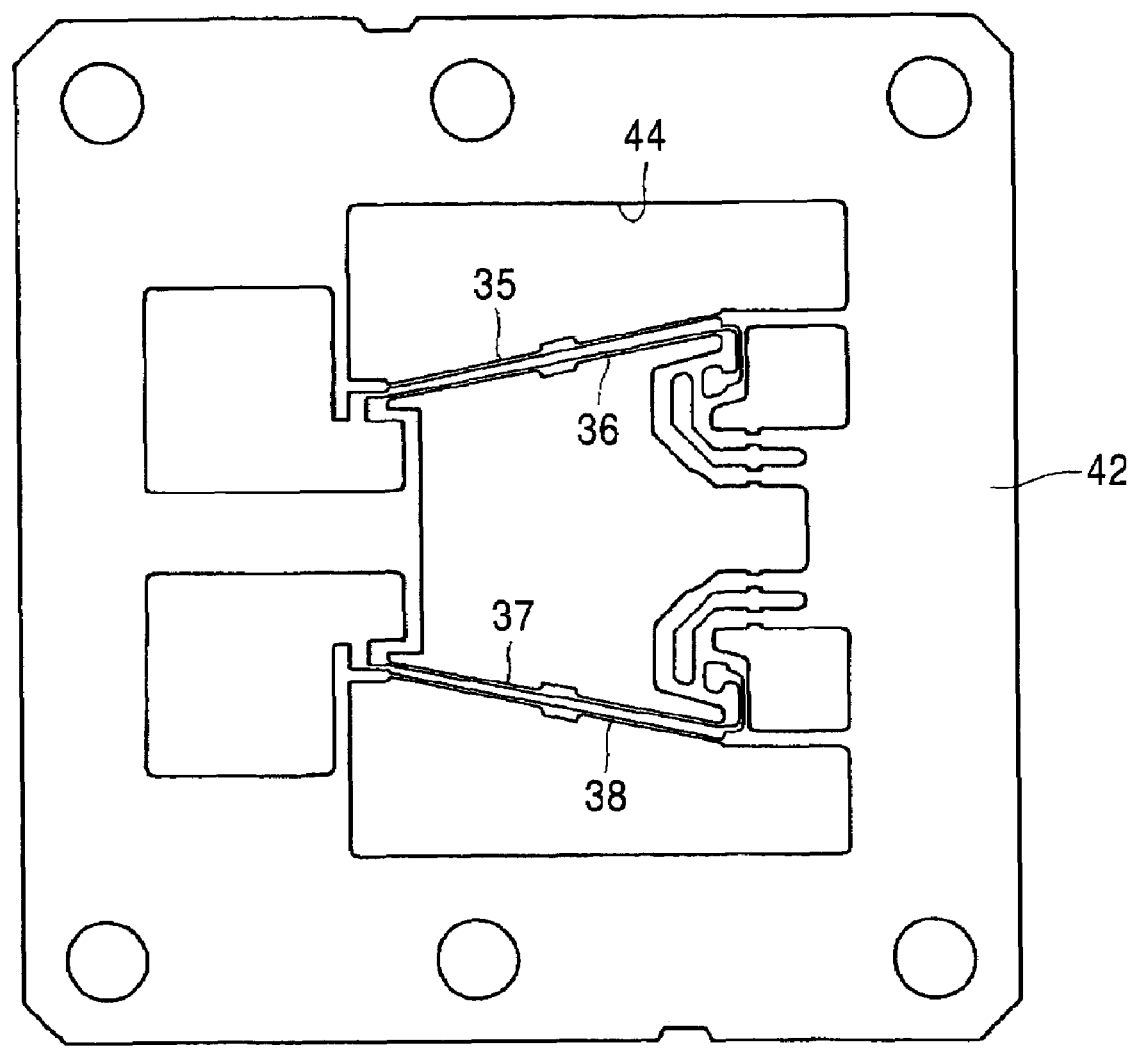
FIG. 7 is a plan view of the lower sheet.
Figure 8:
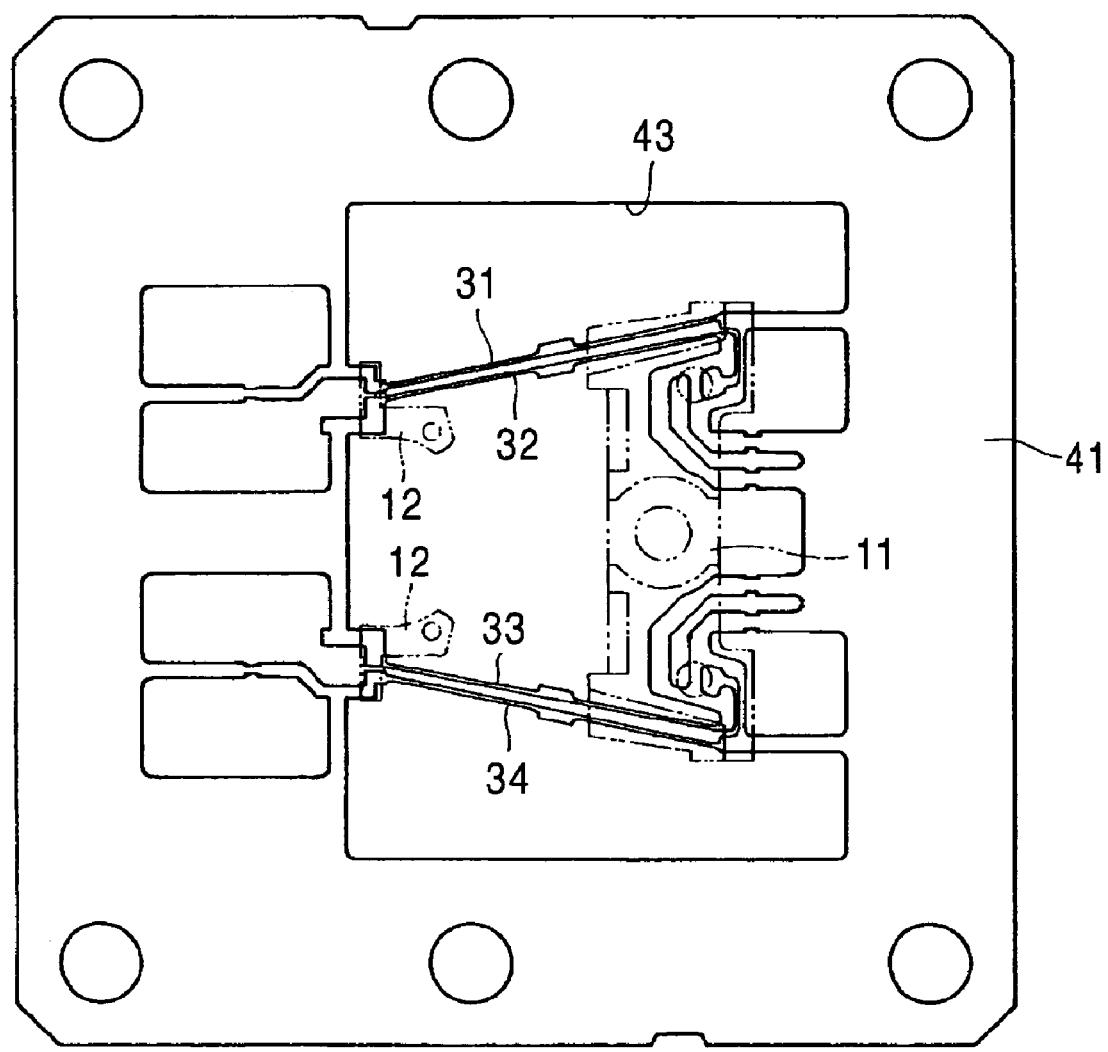
FIG. 8 is a plan view of the upper sheet with the fixed unit and the movable unit mounted by insert-molding.
Figure 9:
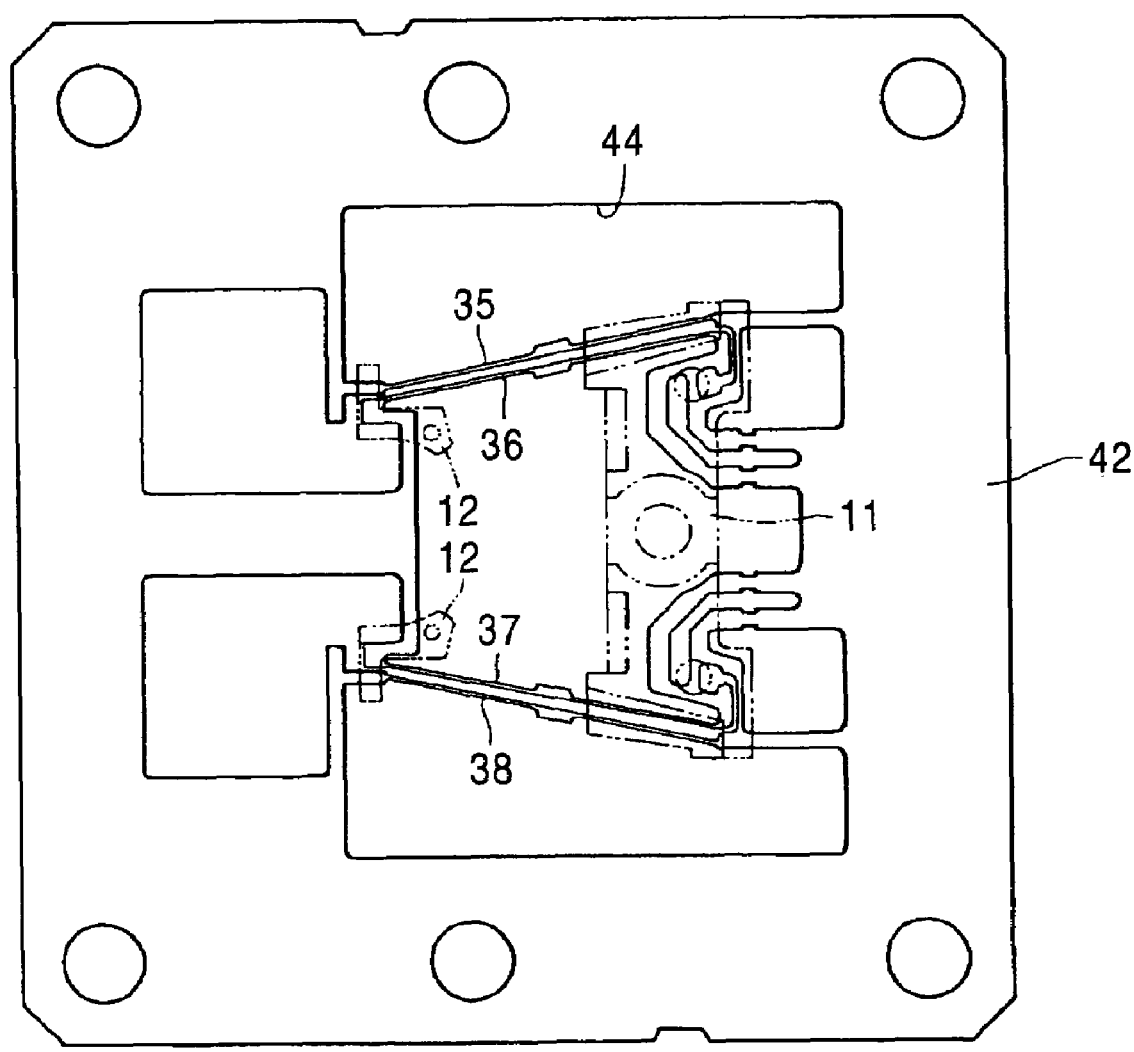
FIG. 9 is a plan view of the lower sheet with the fixed unit and movable unit mounted by insert-molding.

FIG. 6 illustrates the sheet 41 with springs 31 to 34 extending across the opening 43. FIG. 7 illustrates the sheet 43 with springs 35 to 38 extending across the opening 44. The two sheets 41 and 42 are disposed parallel to each other at a predetermined distance. Then, insert-molding is performed to form the fixed unit 11 and the movable unit 12 on the sheets 41 and 42. FIG. 8 illustrates the sheet 41 after insert-molding has been performed. The drawing shows the relationship between the positions of the sheet 41 and the fixed unit 11 and the movable unit 12. FIG. 9 illustrates the relationship between the positions of the sheet 42, which is the lower sheet, and the fixed unit 11 and the movable unit 12.

Figure 5:
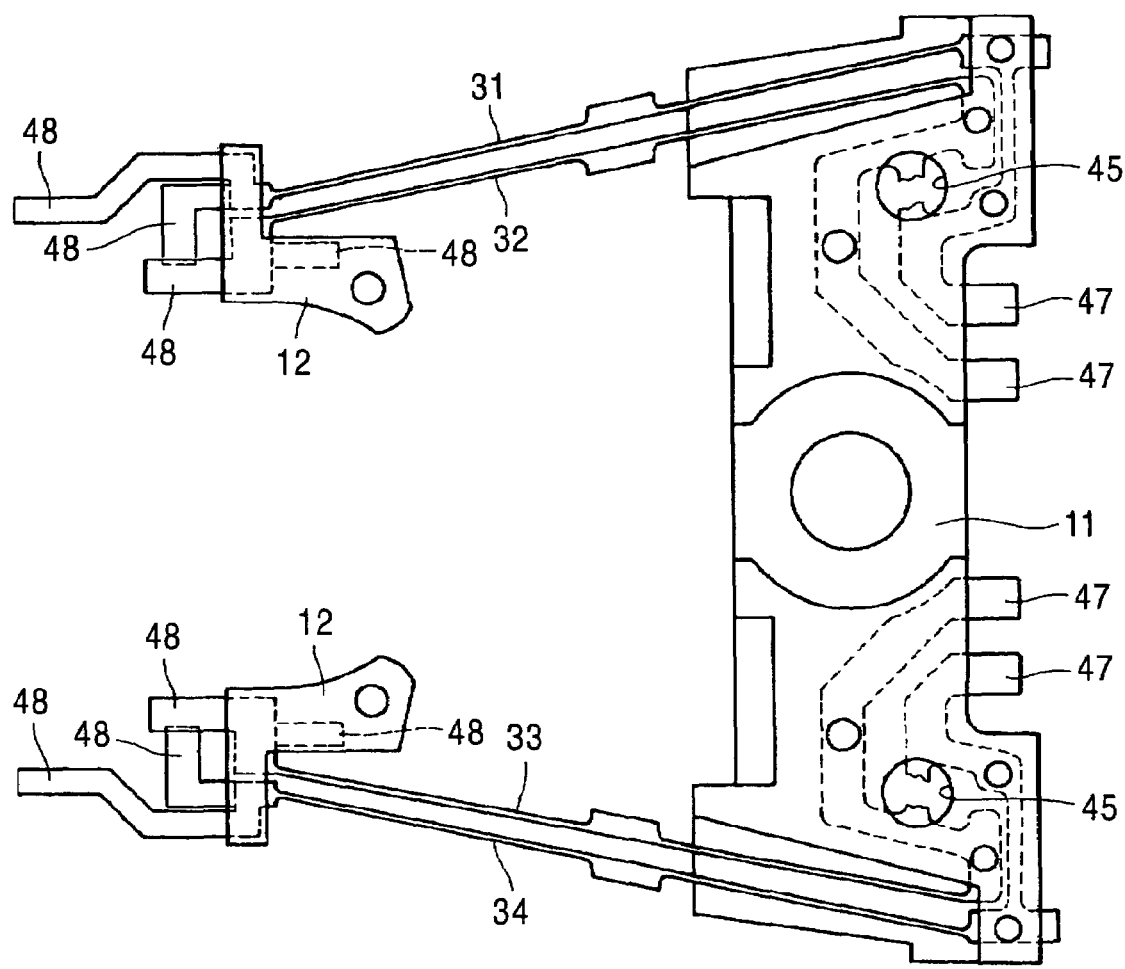
FIG. 5 is a plan view of sheets having had their excess portions removed.

After performing the above-mentioned insert-molding, the peripheral portions of the sheets 41 and 42, which are the portions attached to the metal cast, are removed. In this way, the fixed unit 11 and the movable unit 12 connected to each other by the springs 31 to 38 are formed by insert-molding, as illustrated in FIG. 3. After the insert-molding, through-holes 45 are formed, as illustrated in FIG. 5, to disconnect the wiring on the sheets 41 and 42. In other words, the sheets are connected to each other until the insert-molding is performed. After the insert-molding is completed, the sheets 41 and 42 are punched out. Then, terminals 47 are formed on the fixed unit 11 and terminals 48 are formed on the movable unit 12.

Figure 10:
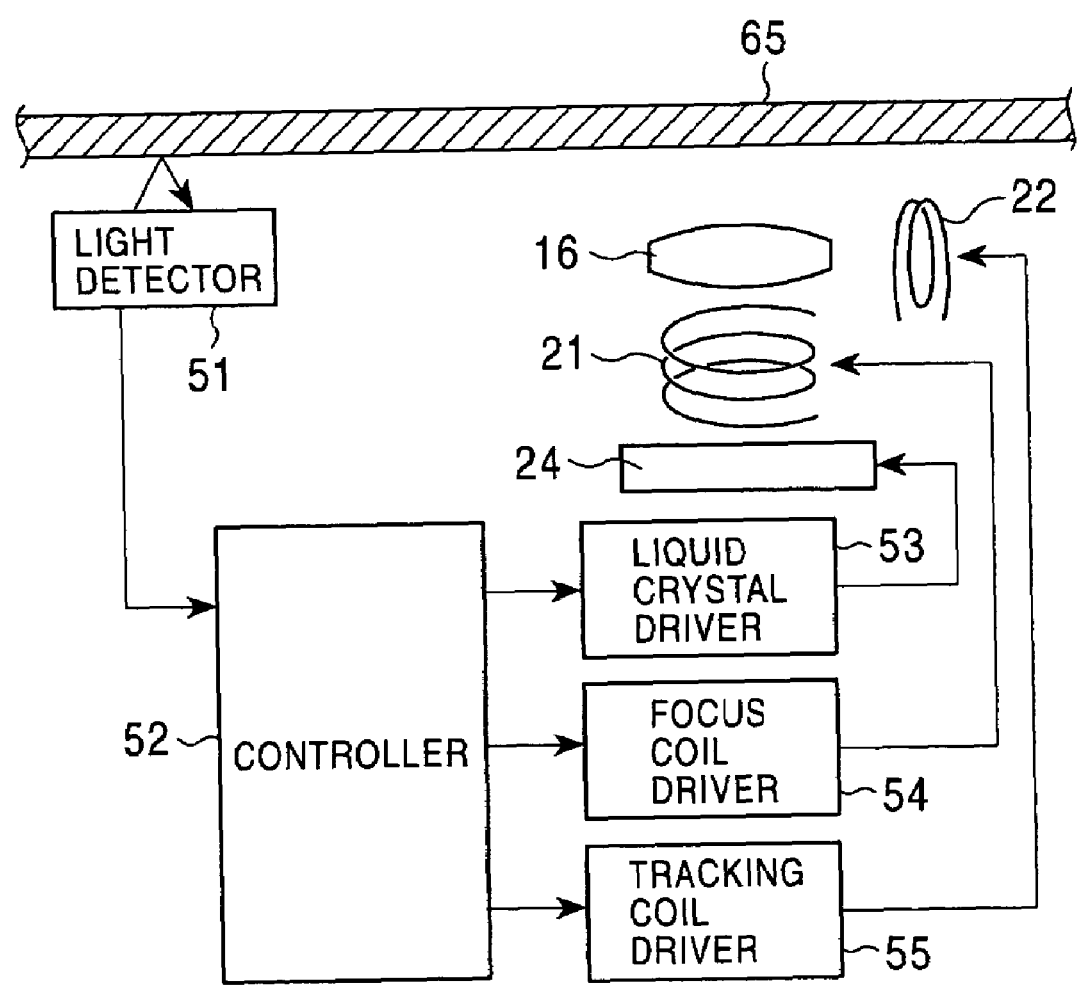
FIG. 10 is a block diagram indicating the control system of an optical pickup apparatus.

FIG. 10 illustrates the control system of the optical pickup apparatus formed by performing insert-molding on the sheets 41 and 42. The optical pickup apparatus includes the fixed unit 11 and the movable unit 12 with attached components. The controlling system includes a light detector 51 for detecting the recording surface of an optical disk 65 and inputs the detected results of the light detector 51 to a controller 52. The controller 52 controls a liquid crystal driver 53, a focus coil driver 54, and a tracking coil driver 55. The liquid crystal driver 53 controls the liquid crystal element 24. The focus coil driver 54 controls the focus servo coil 21. The tracking coil driver 55 controls the tracking servo coil 22.

Figure 12:
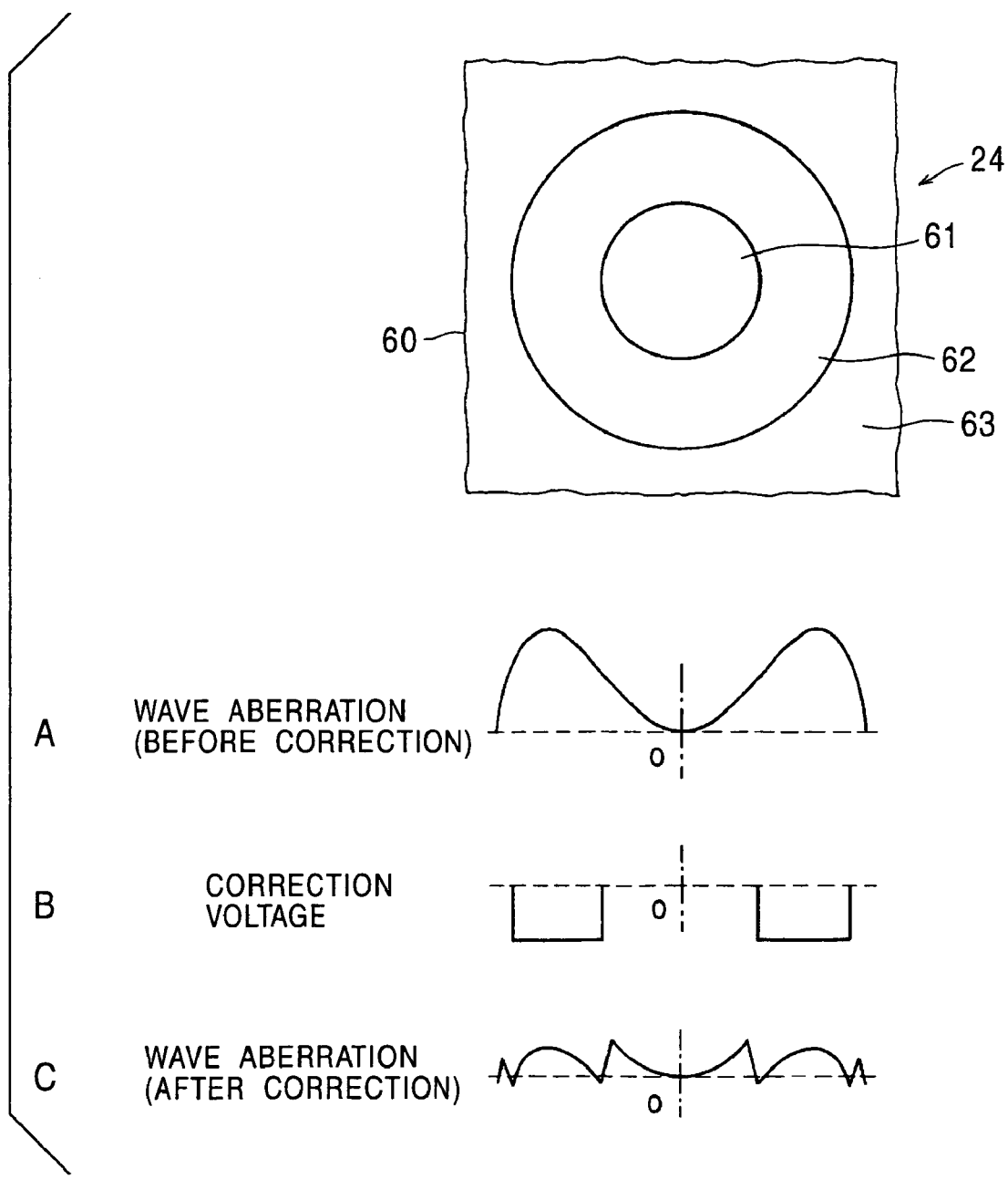
FIG. 12 is a graph indicating the corrected wave aberration.
Figure 13:
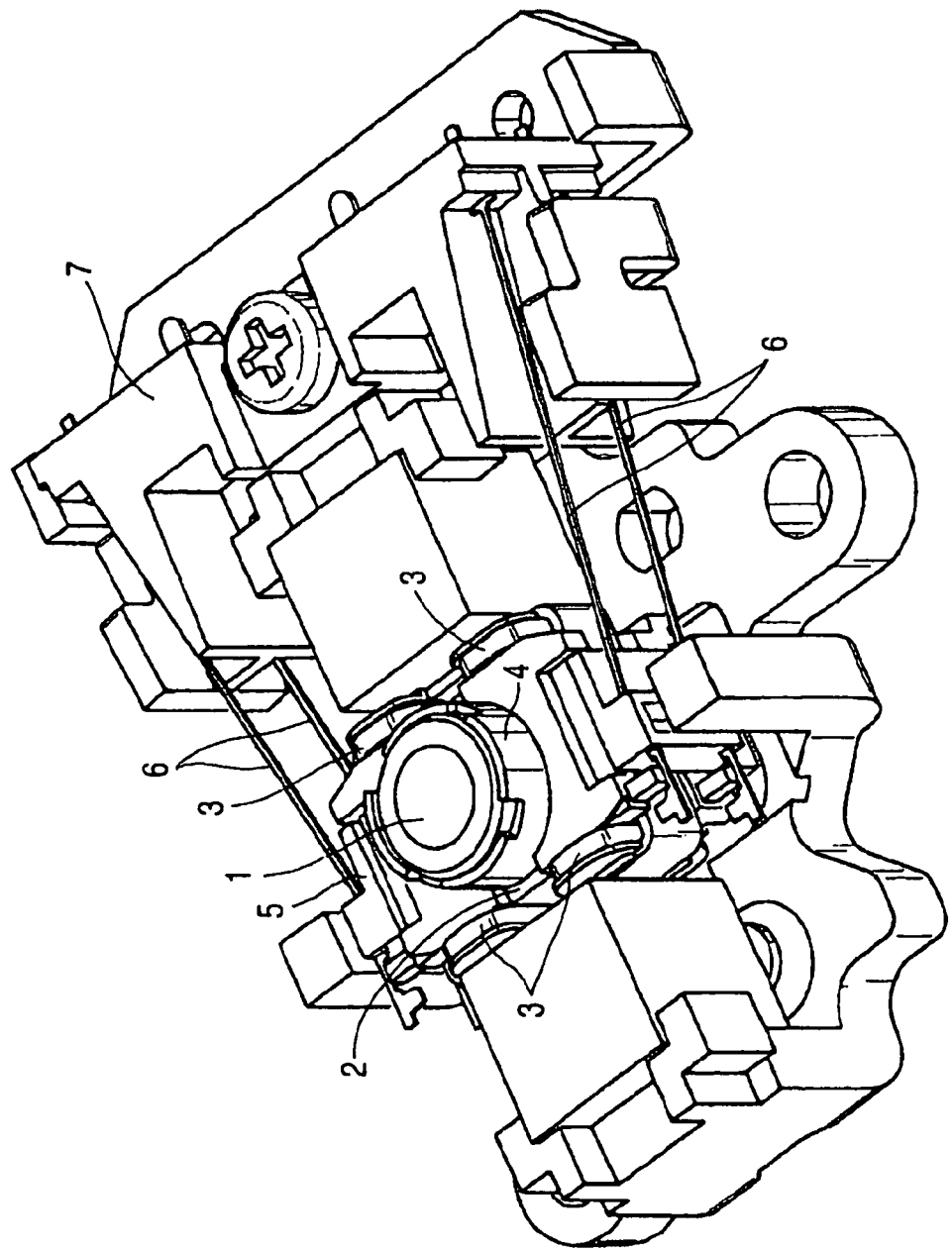
FIG. 13 is an external perspective view of a known optical pickup apparatus.

Correction of the refractive index by the liquid crystal element 24 will be described below. A panel made of the liquid crystal element 24 includes liquid crystal molecules having refractive index anisotropy and being aligned in a predetermined direction. A pair of glass substrates is disposed so that the substrates face each other. On one of the substrates, as illustrated in FIG. 12, concentric electrodes 61 to 63 are formed. These electrodes 61 to 63 correct the refractive index to compensate for the wave aberration. On the other glass substrate, a common electrode is formed on the entire surface.

Figure 11:
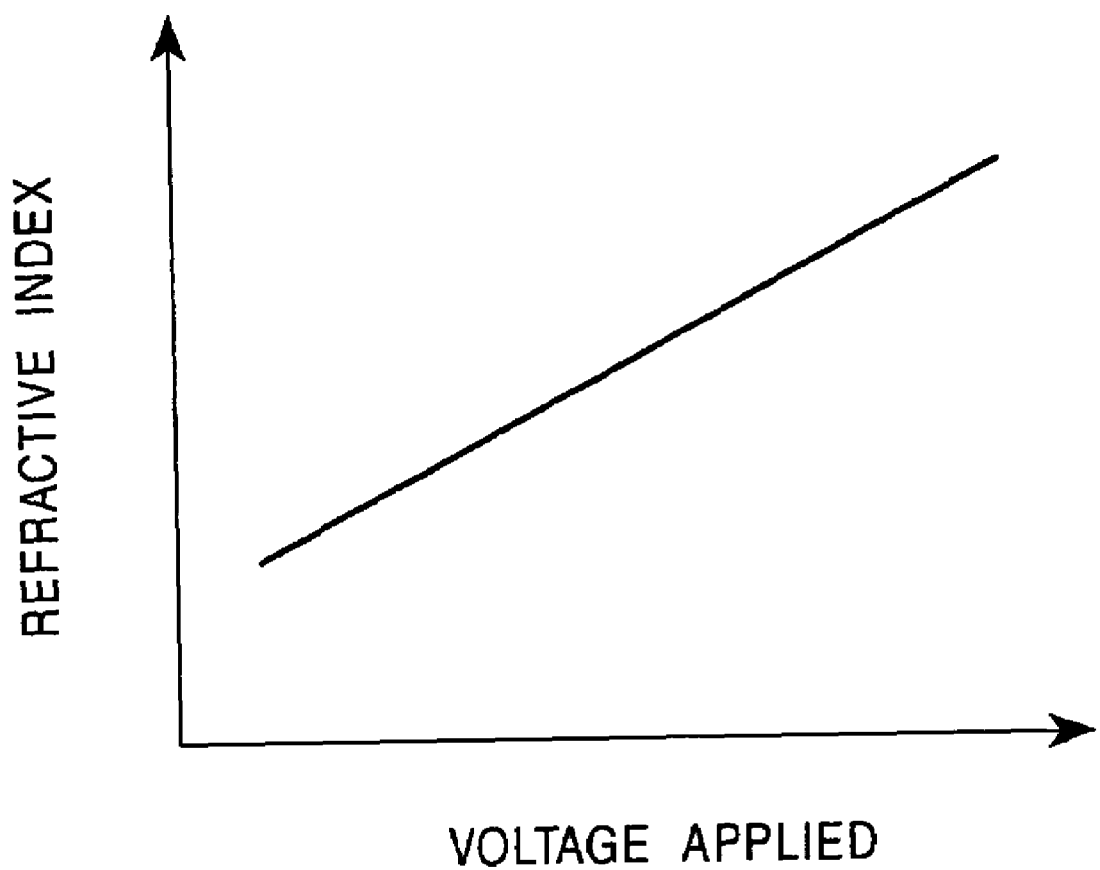
FIG. 11 is a graph indicating the change in refractive index by a liquid crystal element used for correcting the refractive index.

By applying a driving voltage to each of the electrodes 61 to 63 of the above-mentioned liquid crystal element 24, the alignment of the liquid crystal molecules is deflected in accordance with the electrical field caused by the applied voltage. In general, the voltage applied to the liquid crystal and the refractive index have a proportional relationship, as illustrated in FIG. 11, in which the refractive index increases as the applied voltage increases. In other words, the distribution of the refractive index of a cross-section of a beam of light that has passed through the liquid crystal element 24 taken along the direction orthogonal to the traveling direction of the beam of light can be set freely. In this way, the phase of the wavefront of the beam of light can be controlled by each region of the electrodes 61 to 63, as illustrated in FIG. 12. Hence, the liquid crystal element (panel) 24 shown in FIG. 12 can provide means for changing the refractive index.

The laser beam emitted to the recording surface of the optical disk 65 through the objective lens 16 usually has a circular beam spot, and its wave aberration changes in the radial direction. When the thickness between the layers increases, a concentric wave aberration showing a peak in the radial direction occurs, as illustrated in FIG. 12A. Such a wave aberration can be corrected by forming the concentric electrodes 61 to 63 on the glass substrate 60 and applying a voltage to the electrodes 61 to 63 as shown in FIG. 12B. By correcting the wave aberration depicted in FIG. 12A, the aberration is greatly reduced, as shown in FIG. 12C. In this way, the diameter of the beam spot can be reduced so that high density recording becomes possible. The optical pickup apparatus according to this embodiment has a liquid crystal element 24 disposed below the objective lens 16 on the movable unit 12. Therefore, the optical pickup apparatus is capable of reducing wave aberration.

The present invention has been described through the embodiment illustrated in the drawings. The present invention, however, is not limited to this embodiment, and various modifications may be made within the scope of the technical idea of the invention. For example, the optical pickup apparatus according to the above-mentioned embodiment of the present invention has a fixed unit 11 and the movable unit 12 formed by insert-molding, and four springs are formed on each of the sheets 41 and 42. The number of springs, however, is not necessarily limited to the above-mentioned number of springs. In fact, the number of springs may be three for each sheet or five or more for each sheet. Moreover, the number of electrodes formed on the glass substrate 60 of the liquid crystal element 24 may be increased to correct the refractive index more accurately.

What is claimed is:

1. A method for making an optical pickup apparatus comprising the steps of:

forming three or more springs extending across an opening of a metal sheet by punching;

forming a fixed unit and a movable unit on both ends of each of the springs by insert-molding; and removing excess portions of the metal sheet after insert-molding;

wherein each of the springs forms different terminals on both sides of the pickup apparatus individually; and wherein a through-hole is formed in the fixed unit and a connected portion of wirings lying side-by-side from each other, is disconnected at the through-hole after the insert-molding.

2. A method for making an optical pickup apparatus according to claim 1, wherein the fixed unit and the movable unit are formed by the insert-molding on the metal sheet having two of the springs extending across each of the left and right of the sheet.

3. A method for making an optical pickup apparatus according to claim 2, further comprising the steps of:

disposing two of the metal sheets having two of the springs extending across each of the left and right sides of the sheet substantially parallel to each other;

forming the fixed unit and the movable unit by the insert-molding on both ends of the springs; and resiliently supporting the movable unit by a total of eight springs attached to the fixed unit.

4. A method for making an optical pickup apparatus having a movable unit supported by springs attached to a fixed unit, comprising the steps of:

forming three or more of the springs extending across an opening of a metal sheet by punching;

forming the fixed unit and the movable unit on both ends of each of the springs by insert-molding; and removing excess portions of the metal sheet after insert-molding;

wherein each of the springs forms different terminals on both sides of the pickup apparatus individually; and wherein a through-hole is formed in the fixed unit and a connected portion of wirings lying side-by-side from each other, is disconnected at the through-hole after the insert-molding.

5. A method for making an optical pickup apparatus according to claim 4, wherein the fixed unit and the movable unit are formed by the insert-molding on the metal sheet having two of the springs extending across each of the left and right of the sheet.

6. A method for making an optical pickup apparatus according to claim 5, further comprising the steps of:

disposing two of the metal sheets having two of the springs extending across each of the left and right sides of the sheet substantially parallel to each other;

forming the fixed unit and the movable unit by the insert-molding on both ends of the springs; and resiliently supporting the movable unit by a total of eight springs attached to the fixed unit.

7. A method for making an optical pickup apparatus, having a movable unit supported by springs attached to a fixed unit, comprising the steps of:

forming three or more of the springs extending across an opening of a metal sheet by punching;

forming both, the fixed unit on one end of the springs and the movable unit on the other end of the springs, by insert-molding wherein each of the springs individually form a terminal at both the fixed unit and the movable unit;

removing excess portions of the metal sheet after insert-molding; and forming a through-hole which disconnects connected portions of wirings created from the sheets lying side-by-side from each other, after the insert molding.

8. A method for making an optical pickup apparatus according to claim 7, wherein the fixed unit and the movable unit are formed by the insert-molding on the metal sheet having two of the springs extending across each of the left side and right side of the sheet.

9. A method for making an optical pickup apparatus according to claim 8, further comprising the steps of:

disposing two of the metal sheets having two springs extending across each of the left and right sides of the sheet substantially parallel to each other;

forming both the fixed unit on one end of the springs and the movable unit on the other end of the springs by the insert-molding; and resiliently supporting the movable unit by a total of eight springs attached to the fixed unit.

* * * * *

UNITED STATES PATENT AND TRADEMARK OFFICE
CERTIFICATE OF CORRECTION

PATENT NO.       : 7,308,752 B2
APPLICATION NO.  : 10/854216
DATED            : December 18, 2007
INVENTOR(S)      : Tetsu Tanaka It is certified that error appears in the above-identified patent and that said Letters Patent is hereby corrected as shown below:

Column 10, Line 25:
"two springs" should read -- two of the springs --.

Signed and Sealed this

Twenty-ninth Day of April, 2008

JON W. DUDAS
*Director of the United States Patent and Trademark Office*